(12) United States Patent
Seyfer et al.

(10) Patent No.: US 11,797,691 B2
(45) Date of Patent: Oct. 24, 2023

(54) METHOD AND SYSTEM FOR VEHICLE SECURITY DATA RELEASE TO A VEHICLE SECURITY PROFESSIONAL

(71) Applicant: NATIONAL AUTOMOTIVE SERVICE TASK FORCE, Wheat Ridge, CO (US)

(72) Inventors: Donald L. Seyfer, Wheat Ridge, CO (US); Mark Saxonberg, Hermosa Beach, CA (US); Robert Stewart, Davison, MI (US); Steven P. Douglas, Carmichael, CA (US); David Stovall, Plano, TX (US); Lyle Knopf, Grad Blanc, MI (US); Claude Hensley, Clearwater, FL (US)

( * ) Notice: Subject to any disclaimer, the term of this patent is extended or adjusted under 35 U.S.C. 154(b) by 134 days.

(21) Appl. No.: 17/345,862

(22) Filed: Jun. 11, 2021

(65) Prior Publication Data
US 2021/0390192 A1 Dec. 16, 2021

Related U.S. Application Data

(60) Provisional application No. 63/038,260, filed on Jun. 12, 2020.

(51) Int. Cl.
*G06F 21/40* (2013.01)
*G06F 21/60* (2013.01)
(Continued)

(52) U.S. Cl.
CPC .......... *G06F 21/604* (2013.01); *G06F 16/953* (2019.01); *G06F 21/40* (2013.01); *G06Q 10/1053* (2013.01); *G06Q 30/018* (2013.01)

(58) Field of Classification Search
CPC ...... G06F 21/604; G06F 21/40; G06F 16/953; G06Q 10/1053; G06Q 20/018
(Continued)

(56) References Cited

U.S. PATENT DOCUMENTS

2006/0021015 A1* 1/2006 Chambers .......... G07C 9/00857
726/9
2009/0327006 A1* 12/2009 Hansan .................. G06Q 10/10
705/317

(Continued)

*Primary Examiner* — Michael S McNally
(74) *Attorney, Agent, or Firm* — Scott L. Terrell

(57) ABSTRACT

A Secure Access Gateway and Registry is provided for secure access to security related service information, to operate a security feature of a motor vehicle, by a validated Individual. The system is implemented with a general purpose computer, internet, mobile device, and secure data release Registry software application. An Individual is employed as a vehicle service professional. The Individual inputs a Registry Application data. The Registry uses the Registry Application data to generate a background search result data. The Registry uses the search result data to determine eligibility, and assign a Registered Vehicle Service Professional Identification code. The Individual uses the Registered Vehicle Service Professional Identification code to input a Form D1 authorization data, and to access an Automaker website. The Registry uses the D1 authorization data to determine a legal possessory interest in a motor vehicle, to be serviced. The Automaker uses the Automaker motor vehicle data-base, and the D1 authorization data, to generate Automaker security related service information being specific to the motor vehicle. The Automaker security related service information is output to the Individual. The individual uses the Automaker security related service information data to access a security related feature of the motor vehicle.

14 Claims, 3 Drawing Sheets

(51) Int. Cl.
*G06Q 10/1053* (2023.01)
*G06F 16/953* (2019.01)
*G06Q 30/018* (2023.01)

(58) Field of Classification Search
USPC .......................................................... 726/28
See application file for complete search history.

(56) References Cited

U.S. PATENT DOCUMENTS

| 2013/0204423 | A1* | 8/2013 | Overman | ............... | G05B 15/02 |
| | | | | | 700/117 |
| 2017/0161751 | A1* | 6/2017 | Kursar | ............... | G06Q 30/0266 |
| 2018/0307825 | A1* | 10/2018 | O'Hearn | ................ | G06F 21/85 |

* cited by examiner

METHOD AND SYSTEM FOR VEHICLE SECURITY DATA RELEASE TO A VEHICLE SECURITY PROFESSIONAL

CROSS REFERENCE TO RELATED APPLICATIONS

This application filed, pursuant to 35 U.S.C. 111(a), claims the benefit of the earlier filed 35 U.S.C. 111(b) application, Ser. No. 63/038,260, filed 12 Jun. 2020.

STATEMENT OF FEDERALLY SPONSORED RESEARCH

None.

TECHNICAL FIELD

The present invention relates to motor vehicle security information. In particular, it relates to a secure data release model ("SDRM"). The model is a Secure Access Gateway, and Registry method for accessing motor vehicle security related information by a vehicle security professional in order to unlock a security feature of a motor vehicle.

SUMMARY

Registry systems for data release, to motor vehicle security professionals ("VSP"), are well known. Security data release allows technicians, such as locksmiths, to unlock security features of a motor vehicle. Such systems are generally comprised of paper applications, accompanied with documentation, such as Form D-1, being either transmitted via telefax or U.S. Mail, and which typically include applicant data, such as the VSP's driver's license(s), proof of General Liability Insurance, a business license, and/or a locksmith license. A Registry management team then reviews, verifies, and processes these applications manually. The manual verification includes an employment background check, on the primary accounts. Subordinate accounts were required to send background check information together with the Application. After a review and verification of the information, all of the documents are then stored as a paper file.

At the time, the system was made up of a spreadsheet that contained all of the VSPs that were credentialed by Associated Locksmiths of America ("ALOA"), on behalf of the National Automotive Service Task Force ("NASTF"). This spreadsheet was used in conjunction with Automaker, key code, websites so that the Automaker could ping this list, and receive a response back as to the validity of the credential for that Locksmith Identification ("LSID"). The NASTF reviewed the credentials, and would reply to the Automaker as to the Individuals status. Where the reply affirmed the locksmith's credentials, the Automaker would output the security related information. Once the service transaction had been completed, the Automaker would log, and transmit the transaction for input into the NASTF data base and linking with the Locksmith's LSID number.

The Spreadsheet method is time consuming, inefficient, subject to misuse. Moreover, it does not lend itself to frequent periodic compliance-document review, Automaker and VSP transaction data linking, or VSP authentication. In some instances, for example, it had been difficult to ensure continuous insurance coverage, as some applicants would cancel their insurance policies, shortly after verification. In other instances, manual employment-verification-documents were found to be missing, or incomplete. All of this documentation has been deemed necessary in uncovering criminal activities, such as counterfeiting of security keys, accessing criminal records, and in identifying stolen vehicles and VIN numbers. Yet in even other instances, non-authorized service providers have accessed Automaker security information using a registered service provider's identification code.

While the foregoing methods offer some utility, what is needed is an improved Registry system and method to determine a validation for an Individual's access to security related operations, through a Secure Vehicle Gateway, and to provide security related service information, to aftermarket service providers, including key codes, immobilizer reset information, security Personal Identification Numbers (PINs), and other information being necessary to successfully enter, start and operate automobiles and light trucks, at the request of retail consumers, commercial entities, or municipalities able to demonstrate lawful possession, or ownership of the vehicle. What is also needed is an improved Registry system that eliminates the "brokering" of key codes, by a service professional. The present invention satisfies these needs.

DESCRIPTION

It is therefore an object of the present invention to provide a Secure Vehicle Gateway and Registry for validation access to security related service information, including key codes, immobilizer reset information, security Personal Identification Numbers (PINs), and other information being necessary to perform security related operations and successfully enter, start and operate automobiles and light trucks at the request of retail consumers, commercial entities, or municipalities that can demonstrate their lawful possession or ownership of the vehicle to be serviced.

It is another object of the present invention to provide a Secure Vehicle Gateway having a two factor VSP authentication.

It is another object of the present invention to a Registry capable of compiling D1 data into commercial subtype categories.

It is another object of the present invention to provide a Registry having a VSP timed-out document compliance review.

It is another object of the present invention to provide a Registry having an account management for a VSP sub-account.

To overcome the problems of the prior art, and in accordance with the purpose of the invention, as embodied, and broadly described herein, briefly a Secure Vehicle Gateway and Registry is provided for validation of access to security related operations, and secure access to security related service information, for a motor vehicle, by an Individual. The system is implemented with a general purpose computer, internet, mobile device, and secure data release Registry software application. An Individual is employed as a vehicle service professional. The Individual inputs a Registry Application data, for the Individual. The Registry uses the Registry Application data to generate a background search result data, being specific to the Individual. The Registry uses the search result data to determine eligibility and assign a Registered Vehicle Service Professional Identification code for the Individual. The Individual uses the Registered Vehicle Service Professional Identification code to input a Form D1 authorization data, for validation access to an Automaker motor vehicle data-base. The Registry uses the D1 authorization data to determine a legal possessory interest in a motor vehicle, to be serviced. The Automaker, or the Registry, uses the Automaker motor vehicle data-base, and the D1 authorization data, to generate Automaker security related service information being specific to the motor vehicle, to be serviced. The Automaker security related service information is output to the Individual. The individual uses the Automaker security related service information data to access a security related feature of the motor vehicle.

Additional advantages of the present invention will be set forth in part in the description that follows and in part will be obvious from that description or can be learned from practice of the invention. The advantages of the invention can be realized and obtained by the articles of apparel particularly pointed out in the appended claims.

BRIEF DESCRIPTION OF THE SEVERAL VIEWS OF THE DRAWINGS

The accompanying drawings, which are incorporated in and which constitute a part of the specification illustrate at least one embodiment of the invention and, together with the description, explain the principles of the invention.

DETAILED DESCRIPTION OF THE INVENTION

Figure 1:
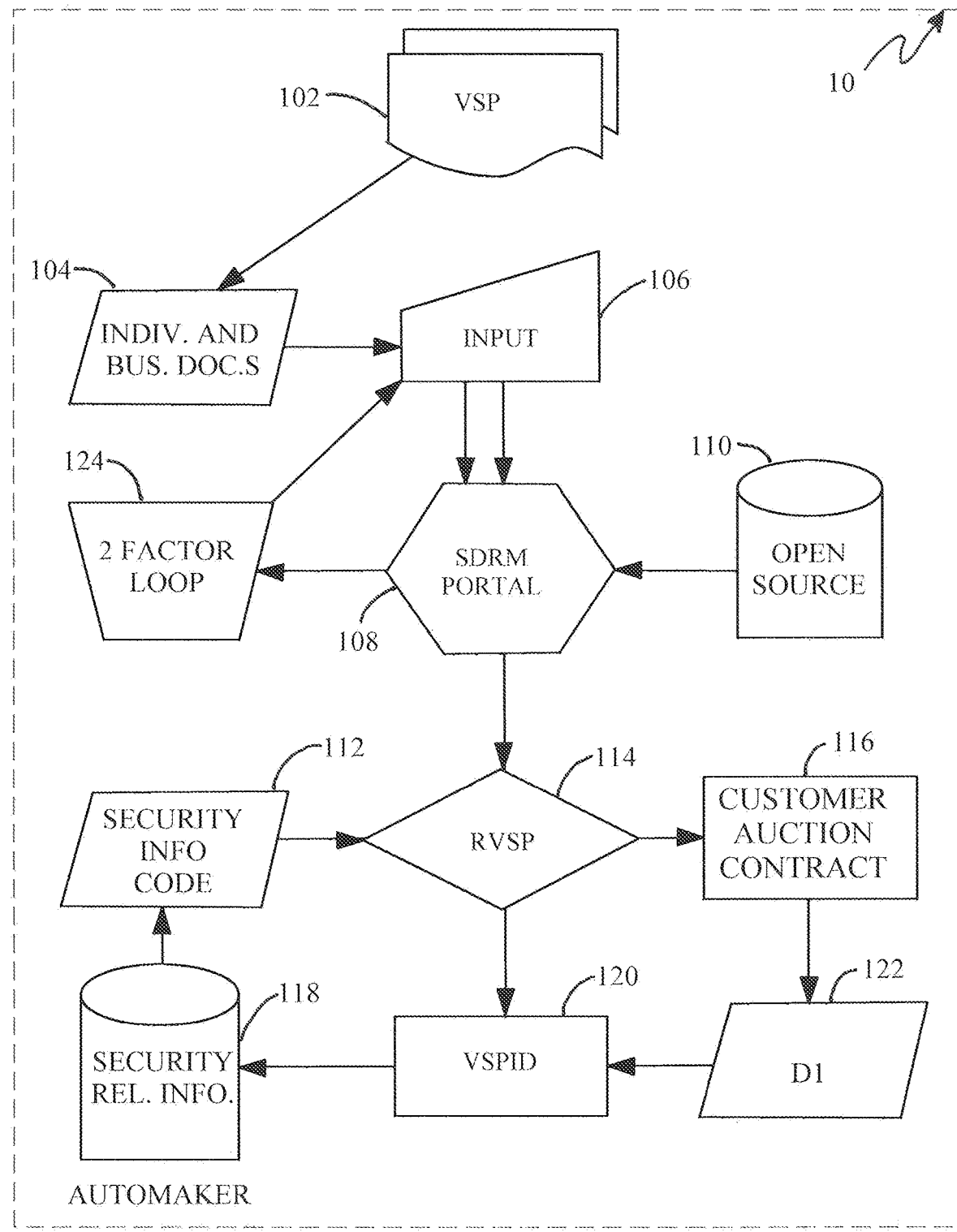
FIG. 1 is a general flow of the basic features of the SDRM system.
Figure 2:
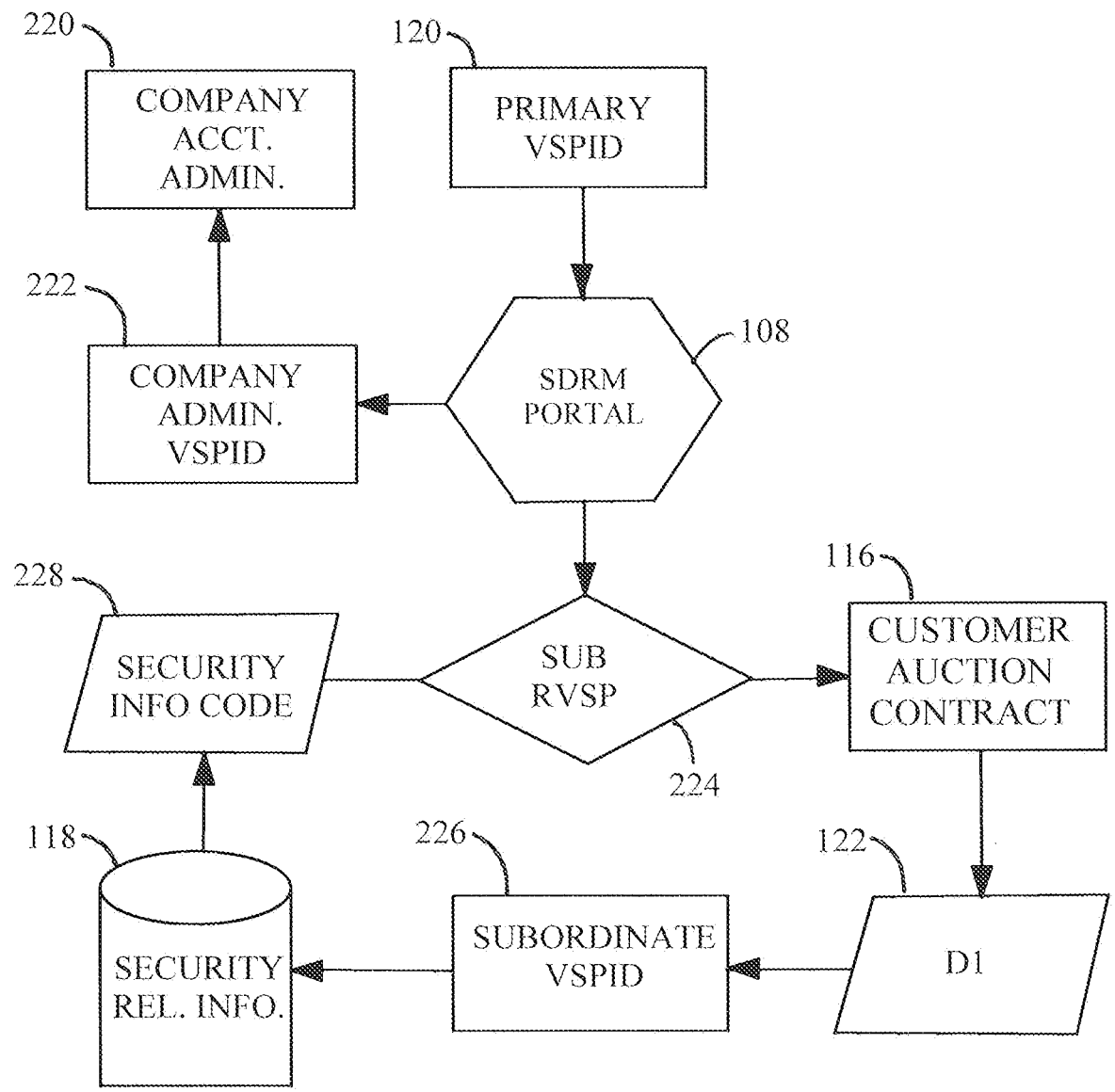
FIG. 2 is a flow diagram representing the process for using the SDRM to generate Company Administrator and Subaccounts.
Figure 3:
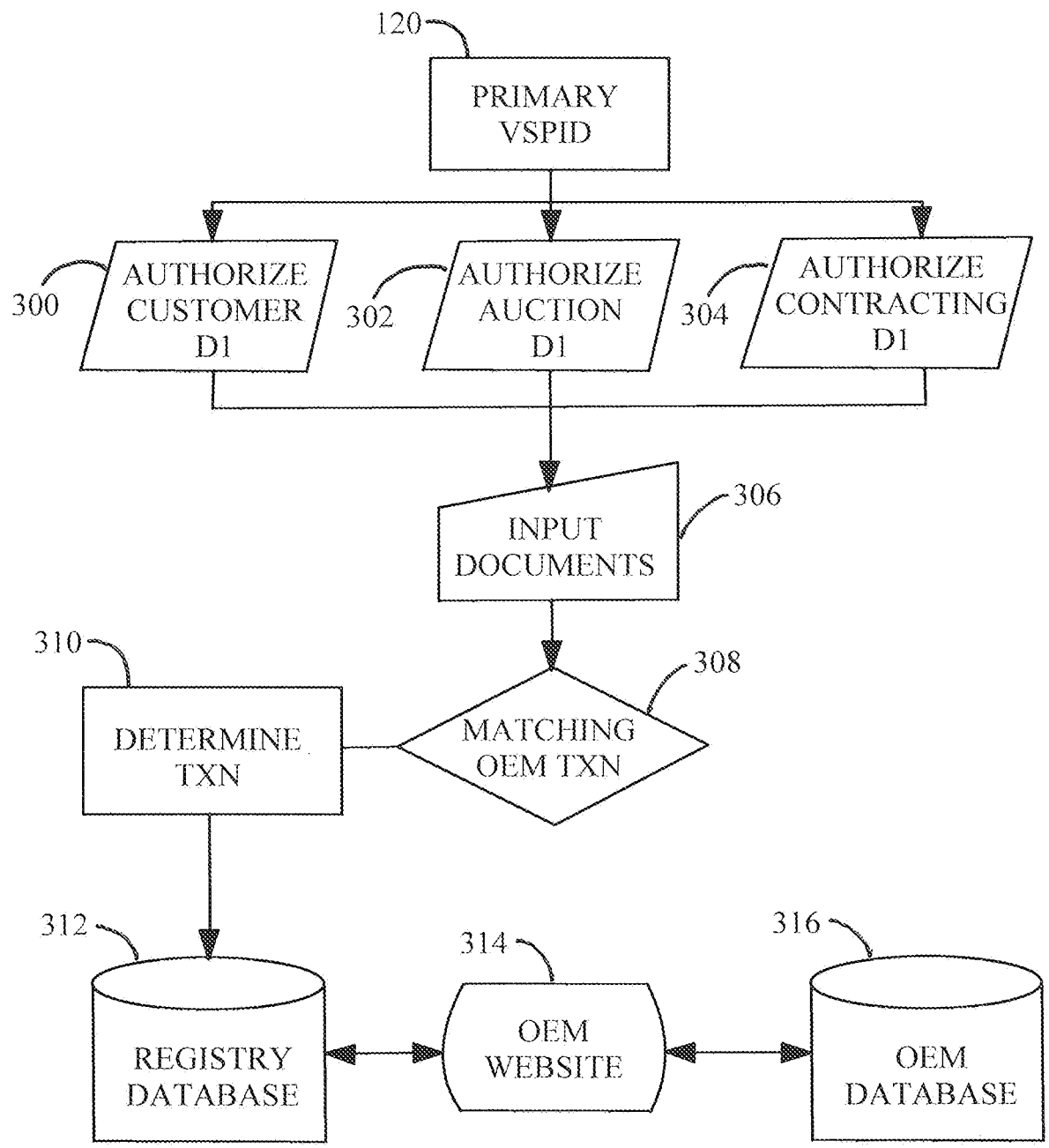
FIG. 3 is a flow diagram representing the process for using the subsets of D1 Form input data.

Unless specifically defined otherwise, all technical or scientific terms used herein have the same meaning as commonly understood by one of ordinary skill in the art to which this invention belongs.

The phrase "secure access to security related service information" is normally understood to mean mechanical key codes, electronic key codes, immobilizer reset codes, personal identification number ("PIN") codes, immobilizer and key information, radio lockout codes, remote codes, security related access to vehicle networks, confirmation of credential for security parts purchase, and tool access authorization.

The term "Automaker" means automobile and truck manufacturers.

The abbreviation "VSP" is in reference to a vehicle security professional lawfully being lawfully engaged in the performance of an automobile security related service transaction.

The term "Individual", as claimed, means the VSP who is making an application for inclusion into the Registry.

"SDRM" means the process, of the present invention, for registration, compliance review, transmission, linking, and output of the security related information between an Individual, employed as a Vehicle Security Professional ("VSP"), an Automaker, and persons being in lawful possession of a motor vehicle and authorized to receive a security related service transaction.

"SDRM" means the process, of the present invention, for registration, compliance review, transmission, linking, and output of the security related information between an Individual, employed as a Vehicle Security Professional ("VSP"), an Automaker, and persons being in lawful possession of a motor vehicle and authorized to receive a security related service transaction.

The phrase "SDRM Portal" means the server and related software and firmware for access and use of the Registry application.

The term "Registry" means the compilation of compliant Individuals, being in possession of an assigned unique Identification compliance code.

The abbreviation "VSPID" means the unique Identification compliance code, determined by the Registry, for use by the Individual to access security related service transaction information from the Automaker.

The abbreviation "RVSP" is used in reference to the Individual having being accepted, upon application and review, into the compilation of the Registry, and having been assigned the VSPID.

The phrase "VSPID Account holder" means the RVSP Individual authorized to access the SDRM Portal using the VSPID, after receiving and transmitting the two-form factor authentication code from the Registry.

The term "Automobile", in addition to its ordinary accepted meaning, is used herein to describe passenger vehicles and light trucks, including, pickup trucks, sport utility vehicles, and vans.

The term "D1 Form" means the Automobile and service transaction specific certification and authorization by a person in lawful possession of the Automobile to engage in a service transaction. The term D1 has been derived from a well-accepted use as a form attachment in the Locksmith service industry. As used herein, the D1 Form data is more broadly used to include Customer authorization, auction authorization, and contracting authorization types as an improvement over the prior art.

Although, any of the methods and materials similar or equivalent to those described herein can be used in the practice or testing of the present invention, the preferred methods and materials are now described. Reference will now be made in detail to the presently preferred embodiments of the invention, examples of which are illustrated in the accompanying drawings wherein like numerals represent like features of the invention.

Referring now to the drawing figures the present invention provides a secure data release Registry model ("SDRM") for access by an RVSP to security related features when performing a service transaction on an Automobile.

The system is implemented using a general purpose computer, internet, a mobile device, and of any type, which are well known in the art. The computer is a micro-processor having input, output, processing, memory, and timer, a Global Positioning module, firmware, hardware, and SDRM application software. The system, may, but need not include a counter, to monitor the behavior of a service professional to ensure that the service professional is not brokering key code data in an unauthorized manner. The Registry is implemented with a server, maintained by a Registry Manager, and the RVSP desirably accesses the Automaker website and Registry with the mobile device.

An Individual is employed as a vehicle service professional 102. "The Registry" 114 is available for use by Individuals 102, employed, working in businesses (sole proprietorships, partnerships and corporations) that have a U.S. Federal taxpayer identification number, a Canadian Business Number (which must be provided during the application process), are properly licensed and registered in all municipalities in which they do business, are in good standing in the jurisdictions where they conduct business, and whose primary business provides repair or replacement services directly to the persons(s) in lawful possession of the Automobile.

Under the "SDRM" 10, security related service information 118 is typically obtained directly from participating Automakers through internet websites and/or similar successor technologies. To gain access to security related service information 118 from participating Automakers, all Individuals 102 must be pre-validated by making application 106 for inclusion to the compilation of "the Registry", and undergoing a criminal background search result.

The Individual 102, inputs 106 a Registry Application data 104 for the Individual 102. The application data 104 includes the applicant's driver's license, proof of General Liability insurance, and copy of the applicant's Business License, when required by the jurisdiction, where the applicant engages in the service, or locksmith related business.

Applicants set up their Registry account online through the SDRM Portal 108. The application process includes two form factor authentications. The two form factor authentication is a notification code transmission and input loop 124. The Registry" is maintained by a Registry manager, who oversees the operation of the Registry. The SDRM Portal 108 generates and transmits an email or text notification, from the Registry, to the Individual 102 applicant, to confirm the Individual's identity. With the presently preferred embodiment, in order to enhance security over the prior art methods, the Individuals access is timed out, until the Individual inputs the two-form-factor identification code, transmitted as a text or email notification, by the Registry, into the SDRM as a step in the two form factor identification loop 124. The two form factor identification loop 124 enhances the SDRM Portal 108 in operation as a Secure Access Gateway. The Individual applicant is then able to upload any of the required documentation 104, for periodic compliance review by the Registry Manager.

The SDRM 10 uses the Individual's application document data to generate a background search result data, being specific to the Individual. The search accesses open source data 110 and information from multiple jurisdictions, law-enforcement, Customs, Border Patrol, Homeland Security, Automakers, and includes empirical data complied through prior use of the SDRM process. The search result is used to as a benchmark to clear the Individual as one who is, or has not, engaged in criminal activity. In this manner, the method, of the present invention, provides a high degree of risk determination and avoidance, by providing credentialing only for those specific individuals as RSVPs 114 who has received a clearance with the search result.

Upon clearance, and registration into the compilation of RVSP 114 Individuals, the Individual is assigned Registered Vehicle Service Professional Identification code (VSPID) account 120. RVSP 114 Individual account holders fall into three categories being "Primary" 120, "Subordinate" 224 or "Company Admin" 222. The VSPIDs 120, 222, and 226 are specific to the RVSP Individual, and is not accessible to other individuals of one's business. Each Individual must make application for entry into the compilation, of the SDRM, thorough the SDRM Portal 108.

Once registered, the Primary RVSP 120 Individual account holder may access the SDRM Portal 108 to add a Subordinate VSPID account 226. The Individual subordinate account 226 is a new application submission. The Subordinate VSPID account 226 Individual is often one charged with the business tasks of managing service related customer account information for the business. Upon acceptance into "the Registry", every RVSP Individual account holder, Primary 120, Subordinate VSPID 226 or Company Administrator VSPID 222, is assigned their own unique VSPID, being that the RVSP Individual is compiled and is in association with the previously registered business. Subordinate VSPID 226 account holders are subject to the same required background search clearances as are the Primary RVSP 120 account Individuals. The Primary VSPID 120 account holder remains fully responsible for all transactions, entered into by the Subordinates, including, without limitation, that the information he held as confidential, is for a single use or transaction, and is not transmitted or stored electronically.

The Company Administrator VSPID 222 account holder is an account that allows the business to identify individuals who may assist with starting Customer Authorization D1 Form data entry, and updating company documents to the SDRM portal 108, of the Registry. As such, the Company Administrator account holder does not have access to security operations on Automaker websites. The Primary RVSP Individual account holder is responsible to make application, and manages Company Administrator accounts.

The Primary RSVP 114 account is valid for two years. After two years, it is timed out by the system. In order to maintain registry in the compilation, the RVSP Individual must submit a Renewal Application via the SDRM Portal 108 before expiration of the two-year expiration date. In this manner the SDRM 10, of the present invention, ensures up-to-date compliance with the compliance data necessary for inclusion into the compilation of the Registry. The system determines, and outputs a reminder Notice for the RVSP Individual to submit a Renewal Application to ensure uninterrupted access.

The Primary RVSP 114 account holder must be located within a "reasonable distance" of the subordinate's location to be able to properly manage operations. "Reasonable Distances" is established, at the discretion of by the Registry Manager, using data including distance, business organizational plans, number of VSPID accounts, and the potential security risks, if any.

A business using "the Registry" (Business A) may use subcontractors and/or independent contractors who are also registered VSPID account holders under a different business account (Business B), excepting, however that the Business B must acquire their vehicle security information under their own VSPID business account, and complete the D1 authorization form for the operation.

The Individual uses the VSPID to input a Form D1 authorization data 122, and to access an Automaker motor vehicle data-base 118, The RVSP services, transfers, or contracts with a customer having title, or lawful possession, of a motor vehicle to be unlocked. This step, in the process, employs the use of inputting D1 form data into the Automaker website, or SDRM Portal 108 Registry. The VSPID Account holders 120, 222, and 226 must manage their own passwords, and generate the D1 Positive ID/Customer Authorization Forms 122. With the present invention, if a VSPID Account holder does not complete entry of the D1 Form data, within five days, of completing that a service related transaction, on the Automaker website, the Account is timed out. With the present invention, the D1 form 122 data fields include a logic processing, and a digital signature feature to successfully save and link up to the Automaker website-transaction.

The Registry uses the D1 form 122 authorization data to determine a Title, or a legal possessory interest in a motor vehicle, to be serviced. The D1 form 122 is an authorization and certification that the information is true and correct, and includes an indemnity clause to hold harmless persons being harmed through any misrepresentation or misuse. The D1 form 122 is service transaction specific, and includes: the authorization and certification; vehicle Owner/Customer basic identification and contact information; Driver's License Number; Driver's License state and expiration date; Vehicle Year, Make, Model and Color; License Plate Number; State of Vehicle Registration; the VIN number; Odometer Reading; and an identification of the service transaction to be performed. The D1 certification and authorization is completed, executed and uploaded, by the account holder.

In yet another embodiment, for each service transaction, the RVSP Individual selects from one, of three, different positive D1 Form Identification data fields, for use in completing and generating a series of specific form field data. The data fields are categorized in a manner being relative to those different customer-types who are making certification of authorization. First, the Customer D1 300, is similar to the prior art information submitted, on paper, by Locksmiths. Here, the Locksmiths typically work directly with a vehicle owner. Second, is an Auction/Repossession Form D1 302, field. This Form field is selected where an auction or repossession agent, who is working in a commercial environment where the vehicles ownership may be in flux. Typically this is data reflective of bank or auction ownership. Finally, the Contracting D1 304 Form field is selected where a RVSP is engaged to perform a service transaction, for another entity, such as a repair shop or a dealership. The D1 data is input 306 through the SDRM Portal 108 and system determines whether there is an ongoing service transaction, having the same VIN number, compares with Automaker matching transaction 308. The system then determines the OEM service transaction and outputs the Registry Database 314.

In this event, the dealership or contracting shop is required to confirm, and to provide to the VSPID Account holder the customer's information, including a driver's license, and proof that the vehicle is owned by that individual. Associating one of the above three selections, in this manner, with the Automakers data greatly enhances the security features, of the present invention.

In yet another embodiment, of the present invention, the Registry collects the vehicle information and vehicle owner authorization (D1), and provides a list of theft-related parts ("TRP") descriptions, for the VSP, to choose from. The Registry transmits that choice to a dealer for fulfillment. The D1 Form Identification data field may be selected with respect to the acquisition by the RVSP of Automobile parts identified as theft-related-parts purchases. Here, The VSPID Account holder, selects and inputs D1 Form field data, representative of a positive customer identification form, and selects the TRP parts that the Automaker deems theft relevant, and selects the Automotive Dealership where the TRP parts are to be purchased. That D1 TRP Form field is completed, transmitted to the SDRM Portal, and that data is transmitted to the Automotive Dealership of the RVSP's choice. In this manner, the SDRM Registry compiles, correlates, and outputs the Automotive Dealership, the TRP parts purchase, D1 Form fields, and the VSPID Account holder to more securely prevent unlawful sale and use of TRP parts. Moreover, this process provides the Automaker an ability to view all of the TRP transactions of its TRP parts by the Automotive Dealership selected by the RVSP.

The present invention may, but need not, include GPS modules, using distance, and transaction data, to determine a behavioral specific data set being suggestive of the "brokering" of key codes by the RVSP and others. In this manner, the present inventions uses the registered location of the VSPID Account holder, an IP address, and the system Counts a series of associated transaction data to determine if they are working in their compiled location, on the D1 Form field specific service transaction. In this manner, the present invention is useful in reducing the occurrences of brokering "key code" information.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Any omissions and substitutions and changes, in the form and details of the devices, and methods described may be made by those skilled in the art without departing from the spirit of the invention. For example, it is expressly intended that all combinations of those elements and/or method steps which perform substantially the same function in substantially the same way to achieve the same results are within the scope of the invention, and not necessarily in a predetermined order of steps.

We claim:

1. A Registry method to provide secure access to security related service information for a motor vehicle, comprising the steps of:
   (a) providing a general purpose computer, internet, mobile device, and secure data release Registry software application;
   (b) providing an Individual being employed as a vehicle service professional;
   (c) inputting a Registry Application data for the Individual;
   (d) using the Registry Application data to generate a background search result data, being specific to the Individual;
   (e) using the search result data and determine eligibility and assign a Registered Vehicle Service Professional Identification code for the Individual;
   (f) using the Registered Vehicle Service Professional Identification code to input a Form D1 authorization data, and for validation of access an Automaker motor vehicle data base;
   (g) using the D1 authorization data to determine a legal possessory interest in a motor vehicle, to be serviced;
   (h) using the Automaker motor vehicle data base and the D1 authorization data to generate an Automaker security related service information being specific to the motor vehicle;
   (i) outputting the Automaker security related service information to the Individual; and
   (j) using the output Automaker security related service information data to operate a security related feature of the motor vehicle by the Individual.

2. The Vehicle Security Professional Registry method, according to claim 1, wherein the step of using the Vehicle Service Professional Identification code, further comprises a step of using a two-factor authentication process.

3. The Vehicle Security Professional Registry method, according to claim 1, wherein the step of using the Registered Vehicle Service Professional Identification code, further comprises a step of inputting a Sub-Account Application data.

4. The Vehicle Security Professional Registry method, according to claim 1, wherein the security related feature is selected from a group, consisting of a key code, an immobilizer reset code, an audio/visual technology-package lockout code, a vehicle entry and start code, and a security Personal Identification Number being used to enter, start, operate, modify, or repair the motor vehicle.

5. The Vehicle Security Professional Registry method, according to claim 1, wherein the step of using the Registered Vehicle Service Professional Identification code, further comprises a step of uploading a compliance document data field.

6. The Vehicle Security Professional Registry method, according to claim 1, wherein the Form D1 authorization data is selected from a group consisting of a customer authorization, a repossession, a theft-relevant-parts purchase, an auction authorization, or a contracting authorization.

7. The Vehicle Security Professional Registry method, according to claim 1, wherein the step of using the Automaker motor vehicle data base and the D1 authorization data further, comprises the steps of inputting Automaker specific transaction information, being specific to the motor vehicle, determining whether an ongoing Automaker specific transaction is being processed, and linking the Automaker specific transaction with the D1 authorization data.

8. The Vehicle Security Professional Registry method, according to claim 1, wherein the Individual, being employed as a vehicle service professional, is as an employee with a Dealership, a locksmith, an Auction, a Repossession, or a Repair entity.

9. The Vehicle Security Professional Registry method, according to claim 1, wherein the search result data is a jurisdictional civil and criminal records data, an employment history data, a commercial and business data, a license data, a third-party reference data, and an insurance policy data.

10. The Vehicle Security Professional Registry method, according to claim 1, wherein the Application Data is selected from a group consisting of a proof of commercial general liability insurance, a Driver's License, a Certificate of Good Standing of the Business standing, a Locksmith License, a Federal Employer Identification Number, a Surety bond, and a proof of employment.

11. The Vehicle Security Professional Registry method, according to claim 1, further comprising the step of determining, periodically, compliance with a requirement of the Vehicle Security Professional Registry, and uploading a compliance document.

12. The Vehicle Security Professional Registry method, according to claim 1, wherein the Automaker security related service information is a database compilation of theft-related-parts.

13. The Vehicle Security Professional Registry method, according to claim 1, further comprising the steps of inputting a key-code brokering profile data, inputting a series of distance data, inputting an IP address and transaction data, and using the distance, IP address and transaction data to determine a correlation with the key-code brokering data to interrupt a key code brokering transaction.

14. The Vehicle Security Professional Registry method, according to claim 1, wherein the method further comprises, providing an automotive scan tool having a customer validation routine, and the Automaker security related service is a validation signal request being generated by the scan tool.

* * * * *